United States Patent
Imani

(10) Patent No.: US 7,391,601 B1
(45) Date of Patent: Jun. 24, 2008

(54) FEEDTHROUGH FILTER ASSEMBLY

(75) Inventor: Reza Imani, Moorpark, CA (US)

(73) Assignee: Pacesetter, Inc., Sylmar, CA (US)

( * ) Notice: Subject to any disclaimer, the term of this patent is extended or adjusted under 35 U.S.C. 154(b) by 231 days.

(21) Appl. No.: 11/457,136

(22) Filed: Jul. 12, 2006

(51) Int. Cl.
*H01G 4/35* (2006.01)
*H01G 4/236* (2006.01)

(52) U.S. Cl. .......................... 361/302; 361/307; 607/5; 607/36

(58) Field of Classification Search .................. 361/302
See application file for complete search history.

(56) References Cited

U.S. PATENT DOCUMENTS

| | | | |
|---|---|---|---|
| 4,424,551 A | 1/1984 | Stevenson et al. | |
| 4,934,366 A | 6/1990 | Truex et al. | |
| 5,333,095 A | 7/1994 | Stevenson et al. | |
| 5,620,476 A | 4/1997 | Truex et al. | |
| 5,683,435 A | 11/1997 | Truex et al. | |
| 5,870,272 A | 2/1999 | Seifried et al. | |
| 5,905,627 A | 5/1999 | Brendel et al. | |
| 6,459,935 B1 | 10/2002 | Piersma | |
| 6,498,952 B2 | 12/2002 | Imani et al. | |
| 6,643,903 B2 | 11/2003 | Stevenson et al. | |
| 6,888,715 B2 | 5/2005 | Stevenson et al. | |
| 7,012,192 B2 | 3/2006 | Stevenson et al. | |
| 2006/0085043 A1* | 4/2006 | Stevenson ..................... | 607/36 |
| 2007/0043399 A1* | 2/2007 | Stevenson et al. ............. | 607/37 |

OTHER PUBLICATIONS

Stevenson, Robert A., "EMI filters for cardiac pacemakers and implantable defibrillators," Medical Electronics, Maxwell Technologies, Carson City, NV, Item 1999, pp. 1-6.

* cited by examiner

*Primary Examiner*—Eric Thomas
*Assistant Examiner*—David M Sinclair

(57) ABSTRACT

A feedthrough filter capacitor assembly for an implantable medical device is provided. The assembly includes a conductive lead, a conductive tube coaxial with and insulated from at least a portion of the lead, a conductive substrate through which the lead and tube pass in non-conductive relation therewith, and a filter capacitor associated with each of the lead and tube. The coaxial design of the filter capacitor assembly increases the number of lead connections while minimizing the footprint of the existing feedthrough layout.

20 Claims, 4 Drawing Sheets

FEEDTHROUGH FILTER ASSEMBLY

FIELD OF THE INVENTION

The present invention relates to electrical feedthrough assemblies, and more particularly to feedthrough filter capacitor assemblies and their use in implantable medical devices.

BACKGROUND

Although it will become evident to those skilled in the art that the present invention is applicable to a variety of implantable medical devices utilizing pulse generators to stimulate selected body tissue, the invention and its background will be described principally in the context of a specific example of such devices, namely, cardiac pacemakers or defibrillators for providing precisely controlled stimulation pulses to the heart. However, the appended claims are not intended to be limited to any specific example or embodiment described herein.

Cardiac pacemakers, and other implantable medical devices such as cardiac defibrillators, are hermetically packaged to isolate the device from the body environment. Such devices require that electrical signals be passed between the packaged device and its external connectors, without compromising the hermeticity of the package.

Typically, electrical coupling between the electronic circuits of the implantable medical device and the external connections provided by a connector assembly mounted outside of the implantable device are provided by a feedthrough assembly. The feedthrough assembly extends through the hermetically sealed outer wall of the device and into the connector assembly so as to couple the electronic circuits within the implantable device to lead-receiving receptacles within the connector assembly. A conductive path is provided through the feedthrough by a conductor pin which is electrically insulated from the container. Many such feedthroughs are known in the art which provide the electrical path and seal the electrical container from its ambient environment.

Such electrical devices can, under some circumstances, be susceptible to electromagnetic interference (EMI). At certain frequencies for example, EMI can inhibit pacing in an implantable medical device. This problem has been addressed by incorporating a capacitor structure within the feedthrough ferrule, thus shunting any EMI at the entrance to the implantable device for high frequencies. This has been accomplished with the aforementioned capacitor structure by combining it with the feedthrough and incorporating it directly into the feedthrough ferrule. Typically, the capacitor electrically contacts the pin lead and the ferrule.

In one approach, a filter capacitor is combined directly with a terminal pin assembly to decouple interference signals to the housing of the medical device. In a typical construction, a coaxial feedthrough filter capacitor is connected to a feedthrough assembly to suppress and decouple undesired interference or noise transmission along a terminal pin.

So-called discoidal capacitors having two sets of electrode plates embedded in spaced relation within an insulative substrate or base typically form a ceramic monolith in such capacitors. One set of the electrode plates is electrically connected at an inner diameter surface of the discoidal structure to the conductive terminal pin utilized to pass the desired electrical signal or signals. The other or second set of electrode plates is coupled at an outer diameter surface of the discoidal capacitor directly or indirectly (for example, via a ground lead) to a cylindrical ferrule of conductive material, wherein the ferrule is electrically connected in turn to the conductive housing or case of the implantable medical device.

Feedthrough capacitors of this general type are commonly employed in implantable pacemakers, defibrillators and the like, wherein a device housing is constructed from a conductive biocompatible metal such as titanium and is electrically coupled to the feedthrough filter capacitor. The filter capacitor and terminal pin assembly prevent interference signals from entering the interior of the device housing, where such interference signals might otherwise adversely affect a desired function such as pacing or defibrillating.

Although feedthrough filter capacitor assemblies of the types described above have performed in a generally satisfactory manner, it would be advantageous to be able to increase the number of lead connections while minimizing the footprint of the existing feedthrough layout and reducing cost of manufacture.

SUMMARY

A feedthrough filter capacitor assembly for an implantable medical device is disclosed. The capacitor assembly comprises a conductive lead; a conductive tube coaxial with and insulated from at least a portion of the lead; a conductive substrate through which the lead and tube pass in non-conductive relation therewith; a first filter capacitor having a passageway through which the tube extends, the tube being electrically coupled to the first filter capacitor; and a second filter capacitor having a passageway through which the lead extends, the lead being electrically coupled to the second filter capacitor.

The coaxial design of the filter capacitor assembly increases the number of lead connections while minimizing the footprint of the existing feedthrough layout, and is expected to simplify the manufacturing process of feedthrough assemblies and reduce costs.

Further features, advantages, and benefits will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate typical embodiments of the invention, and together with the description, serve to explain the principles of the invention in general terms.

BRIEF DESCRIPTION OF THE DRAWINGS

The foregoing aspects and other features of the present invention are explained in the following description, taken in connection with the accompanying figures, wherein.

DETAILED DESCRIPTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described. Other embodiments are possible, and modifications may be made to the embodiments within the spirit and scope of the present invention. Therefore, the following detailed description is not meant to limit the invention. Rather, the scope of the invention is defined solely by the appended claims.

A feedthrough filter capacitor assembly for an implantable medical device is disclosed. The feedthrough filter capacitor assembly includes a conductive terminal lead; a conductive terminal tube coaxial with and insulated from at least a portion of the lead, a conductive substrate through which the lead and tube pass in non-conductive relation therewith, a first filter capacitor having a passageway through which the tube extends, and a second filter capacitor having a passageway through which the lead extends. In the feedthrough filter capacitor assembly, the tube is electrically coupled to the first filter capacitor, and the lead is electrically coupled to the second filter capacitor.

A ground lead can be coupled to the conductive substrate and extend into a second passageway of the first filter capacitor in conductive relation therewith and extend into a second passageway of the second filter capacitor in conductive relation therewith.

Figure 1:
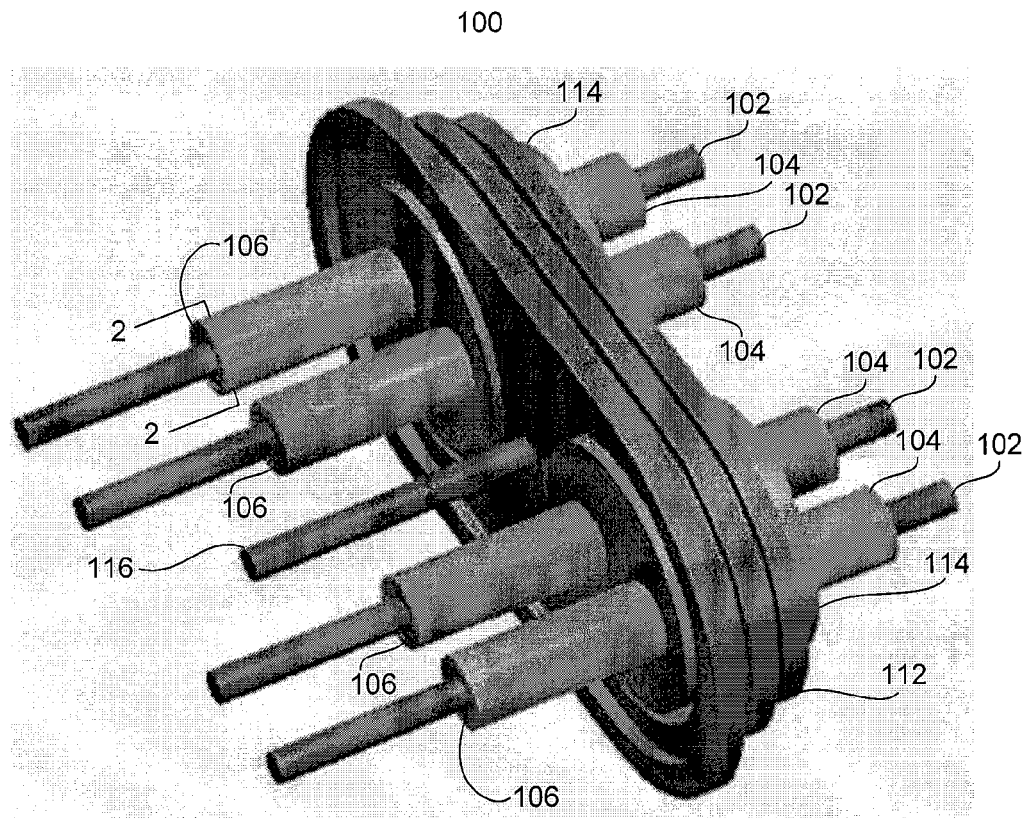
FIG. 1 is a perspective view of a terminal subassembly having four terminal leads, four terminal tubes coaxial with the terminal leads, and a ground pin mounted to a conductive ferrule.

Referring now to the drawings, FIG. 1 illustrates a perspective view of components of an internally grounded, eight pole feedthrough terminal subassembly 100. Terminal subassembly 100 includes four conductive terminal leads or pins 102, four conductive terminal tubes 104, a ground lead 116, insulators 106 and 114, and a conductive substrate or ferrule 112. The terminal subassembly 100 can comprise a prefabricated terminal subassembly.

The conductive terminal leads or pins 102 and terminal tubes 104 can be composed of any suitable conductive material, and can be the same or different material. Suitable materials for the terminal leads 102 and/or terminal tubes 104 include niobium, titanium, titanium alloys such as titanium-6AI-4V or titanium-vanadium, platinum, molybdenum, zirconium, tantalum, vanadium, tungsten, iridium, rhodium, rhenium, osmium, ruthenium, palladium, silver, and alloys, mixtures and combinations thereof. The terminal leads 102 and terminal tubes 104 may both be made of a platinum/iridium alloy.

Figure 2:
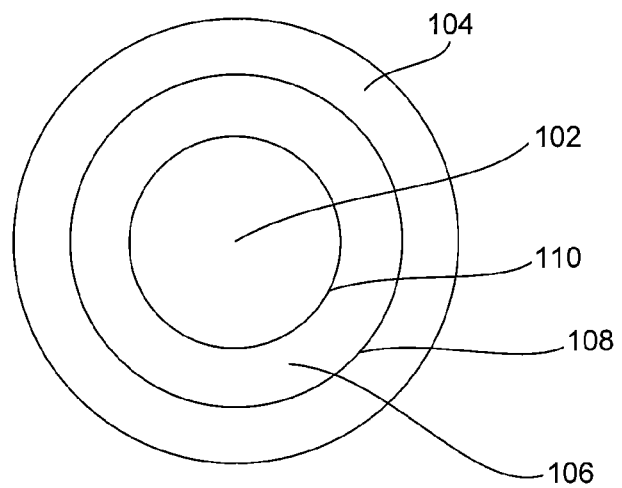
FIG. 2 is a cross-sectional view of one coaxial terminal lead and tube of the terminal subassembly of FIG. 1.

In the feedthrough terminal subassembly 100 illustrated in FIG. 1, each of the terminal tubes 104 is coaxial with and insulated from a terminal lead 102. As illustrated in FIG. 1 and FIG. 2, the terminal tubes 104 and the terminal leads 102 are electrically insulated from one another by ring-shaped insulators 106. The insulators 106 are fixed to the inner surface 108 of each of the terminal tubes 104 and the outer surface 110 of each of the terminal leads 102. The insulators can be fixed by methods known to those skilled in the art, including gold brazing.

Insulators 106 can be composed of any suitable electrically insulative material, including alumina (or aluminum oxide) or ceramic-containing material having sapphire or zirconium oxide.

The conductive substrate or ferrule 112 comprises an elongated ring-shaped structure having a radially outwardly opening channel structure which is adapted to be mounted onto a housing of an implantable medical device in a position extending through an opening of the housing (not shown). The ferrule 112 is typically laser welded to the housing of an implantable medical device, but can be welded by other means, or even soldered or glued thereto. The ferrule 112 can be composed of a suitable biocompatible conductive material such as titanium or titanium alloy such as titanium-6AI-4V.

The ferrule 112 has two apertures through which ring-shaped insulators 114 are positioned and hermetically sealed thereto and through which terminal tubes 104 and terminal leads 102 pass in non-conductive relation. The ferrule also has a third aperture in its center in which a ground lead 116 is positioned and brazed or welded to the ferrule 112 to provide a ground connection to the housing of the implantable medical device.

The insulators 114 provide electrical insulation between the terminal tubes 104 and the ferrule 112. The insulators 114 each contain two passageways through which the terminal tubes 104 and terminal leads 102 extend and are preferably hermetically sealed therewith. The insulators 114 can be composed of one or more of the insulative materials listed above for insulator 106, and can be the same or different material as insulator 106.

The ground lead 116 can be composed of one or more of the materials listed above for the terminal leads 102 and terminal tubes 104, and can be the same or different material as terminal leads 102 and/or terminal tubes 104. The ground lead may be made of a platinum/iridium alloy.

Figure 3:
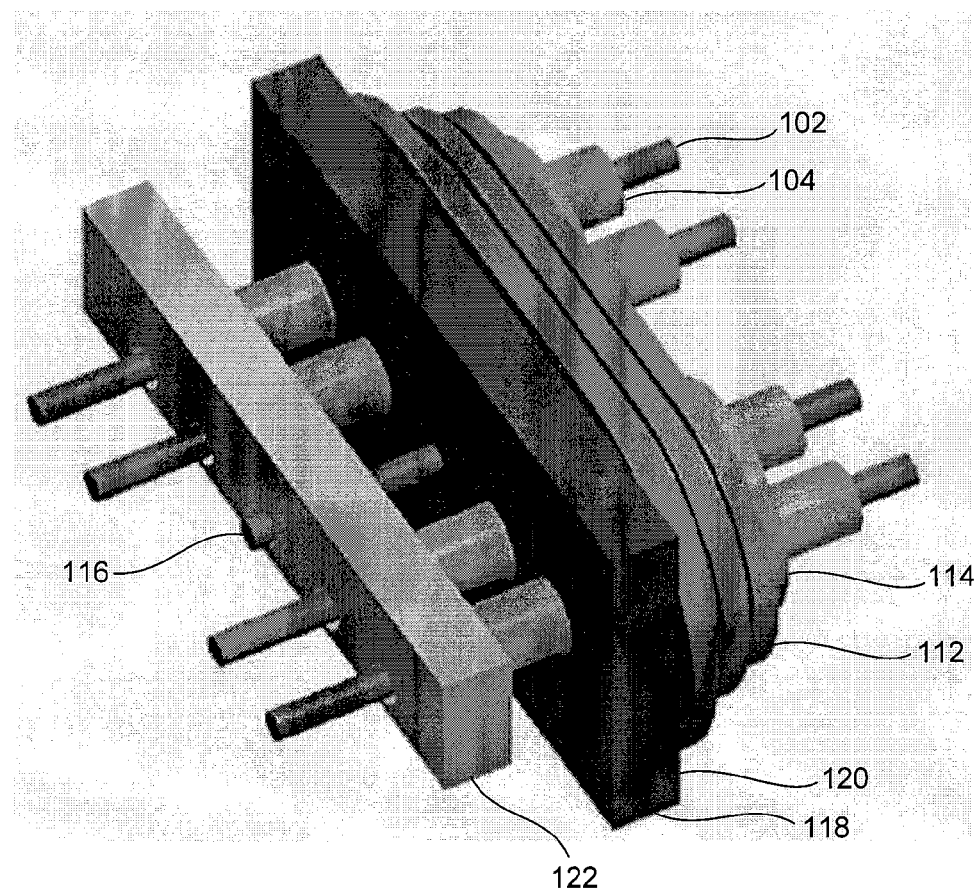
FIG. 3 is a perspective view of the terminal subassembly of FIG. 1 having filter capacitors coupled to the leads and to the tubes.

FIG. 3 illustrates a perspective view of the terminal subassembly of FIG. 1 having two filter capacitors 118 and 122 coupled to the terminal tubes 104, terminal leads 102, and ground lead 116 to suppress and decouple undesired interference or noise transmission along the terminal leads 102 and terminal tubes 104 when used in an implantable medical device.

The first filter capacitor 118 is coupled at one end 120 to a surface of the ferrule 112 and the insulator 114 (not shown), and has four passageways, through which each of the four terminal tubes 104 are affixed and electrically coupled to and extend through and a passageway through which the ground lead 116 is affixed and electrically coupled to and extends through.

The second filter capacitor 122 has four passageways through which each of the four terminal leads 102 are affixed and electrically coupled to and extend through and a center passageway through which the ground lead 116 is affixed to and extends through.

In FIG. 3, the first filter capacitor 118 does not and need not physically contact the terminal leads 102. Similarly, the second filter capacitor 122 does not and need not contact the terminal tubes 104.

The first and second filter capacitors 118 and 122 are typically discoidal filter capacitors having two sets of electrode plates embedded in spaced relation within an insulative substrate or base typically forming a ceramic monolith (not shown). Suitable discoidal filter capacitors are manufactured by AVX Corporation (Myrtle Beach, S.C.) and Greatbatch, Inc. (Clarence, N.Y.).

In an embodiment wherein the first filter capacitor 118 is a discoidal capacitor, one set of the electrode plates of the first filter capacitor 118 is electrically connected at an inner diameter surface to the terminal tubes 104. The other or second set of electrode plates of the first filter capacitor 118 is coupled to the ground lead 116, which is electrically connected to the ferrule 112 which in turn is electrically connected to the conductive housing or case of the implantable medical device.

Similarly, in an embodiment wherein the second filter capacitor 122 is a discoidal filter capacitor, one set of the electrode plates of second filter capacitor 122 is electrically connected at an inner diameter surface to the terminal leads 102. The other or second set of electrode plates of the first filter capacitor 122 is coupled at an outer diameter surface to the ground lead 116, which is electrically connected to the ferrule 112 which in turn is electrically connected to the conductive housing or case of the implantable medical device.

The number and dielectric thickness spacing of the electrode plate sets varies in accordance with the capacitance value and the voltage rating of the discoidal capacitor. When used in an implantable medical device, the first and second discoidal capacitors 118, 122 permit passage of relatively low frequency electrical signals along the terminal tube 104 and terminal pin 102, respectively, while shielding and decoupling/attenuating undesired interference signals of typically high frequency to the conductive housing.

Figure 4:
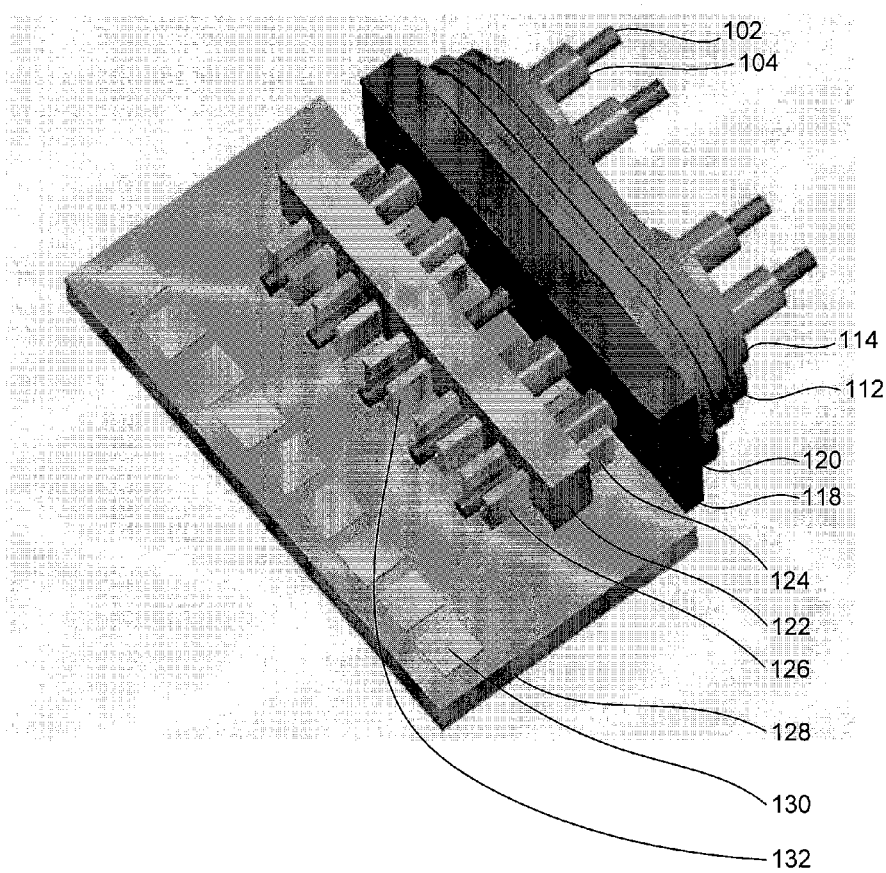
FIG. 4 is a perspective view of the terminal subassembly of FIG. 3 mounted to a substrate that is adapted to be electrically coupled to internal circuitry disposed within an implantable medical device.

The terminal leads 102 and terminal tubes 104 are adapted to be electrically coupled to internal circuitry disposed within an implantable medical device. FIG. 4 illustrates a perspective view of the terminal assembly of FIG. 3 coupled to a substrate 128 that provides electrical coupling to internal circuitry disposed within an implantable medical device (not shown).

In FIG. 4, substrate 128 is made of a nonconductive material and typically comprises a ceramic material. The substrate contains conductive paths in its interior (not shown) to electrically couple the terminal leads 102, terminal tubes 104, and ground lead 116 to internal circuitry of an implantable medical device.

A first set of four conductive holders 124 and a second set of five conductive holders 126 are disposed on the substrate 128. The conductive holders 124 and 126 can be of the same or different conductive material such as, but not limited to nickel, an iron-nickel-cobalt alloy such as KOVAR (29% Ni, 17% Co and 53% Fe), a copper alloy, or a stainless steel alloy such as 446, 29-4-2 or 52 alloy. In addition, the conductive holders 124, 126 can be partially or completely plated with gold. In one embodiment, the conductive holders 124, 126 are composed of a gold-plated iron-nickel-cobalt alloy such as gold-plated KOVAR.

The conductive holders 124, 126 can be affixed to the substrate 128 by any suitable method. For example, the conductive holders 124, 126 can be brazed to a ceramic substrate 128 at about 1000° C.

The first set of four conductive holders 124 is of a suitable shape and size to receive the four terminal tubes 104. The second set of five conductive holders 126 are of a suitable shape and size to receive the four terminal leads 102 and (in the case of the center conductive holder 132) the ground lead 116.

Also as shown in FIG. 4, substrate 128 has a plurality of wire bonding pads 130 disposed thereon. The number of wire bonding pads typically equals the number of conductors plus the ground lead. The wire bonding pads may be of any suitable shape and dimension. The wire bonding pads can be composed of any suitable conductive material such as, but not limited to copper. In addition, the wire bonding pads can be partially or completely plated with, for example nickel and/or gold (for example, nickel-plated and then gold-plated). The wire bonding pads may be deposited on or in the substrate by methods known by those skilled in the art.

The wire bonding pads 130 are adapted to be conductively coupled to the first or second conductive holders 124, 126 by conductive paths in the inside of the substrate 128 (not shown). For example, each of the four of the first set of conductive holders 124 is conductively coupled to an individual wire bonding pad 130, and each of the five of the second set of conductive holders 126 is conductively coupled to an individual wire bonding pad 130. Methods of making conductive paths in the substrate 128 between the conductive holders 124, 126 and the wire bonding pads 130 are known to those skilled in the art.

The wire bonding pads 130 are adapted to be electrically coupled to internal circuitry disposed within an implantable medical device by, for example gold wires attached to the wire bonding pads and to the internal circuitry of the implantable medical device.

Also as shown in FIG. 4, the four terminal tubes 104 of the terminal assembly 100 are electrically coupled to the first set of four conductive holders 124, and the four terminal leads 102 are electrically coupled to the second set of four conductive holders 126. Ground lead 116 is electrically coupled to the center conductive holder 132 of the set of second conductive holders 126. The terminal tubes 104, terminal leads 102, and ground lead 116 can be electrically coupled to conductive holders 124 and 126 by any suitable method, for example by being laser welded.

In the embodiment illustrated in FIG. 4, the first filter capacitor 118 need not physically contact the substrate 128, although in other embodiments it may do so. Similarly, the second filter capacitor 122 separates the conductive holders 124 and 126 and need not physically contact the conductive holders nor the substrate 128, although it may do so.

Figure 5:
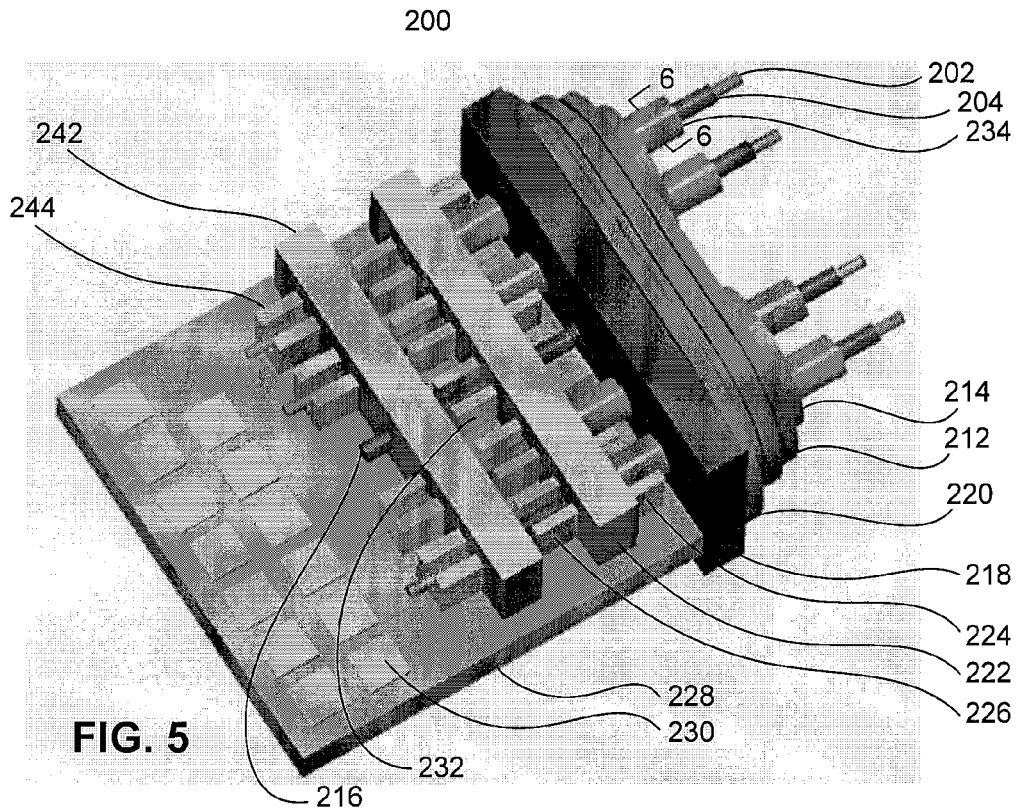
FIG. 5 is a perspective view of a terminal assembly having four terminal leads, a first set of four terminal tubes coaxial with the terminal leads, a second set of four terminal tubes coaxial with the first set of terminal tubes, and a ground pin mounted to a conductive ferrule, which is coupled to a substrate that is electrically coupled to internal circuitry disposed within an implantable medical device.

FIG. 5 illustrates a perspective view of a feedthrough filter capacitor assembly 200 having an additional conductive terminal tube 234 coaxial with and insulated from a terminal tube 204 and a terminal lead 202, mounted to a substrate 228 that is electrically coupled to internal circuitry disposed within an implantable medical device, to form an internally grounded, twelve (12) pole feedthrough terminal assembly.

Terminal assembly 200 includes four conductive terminal leads or pins 202, a first set of four conductive terminal tubes 204, each first terminal tube 204 coaxial with and insulated from each terminal lead 202. Terminal assembly 200 further includes a second set of four conductive terminal tubes 234, coaxial with and insulated from each of the first set of conductive terminal tubes 204 and from each terminal lead 202.

Figure 6:
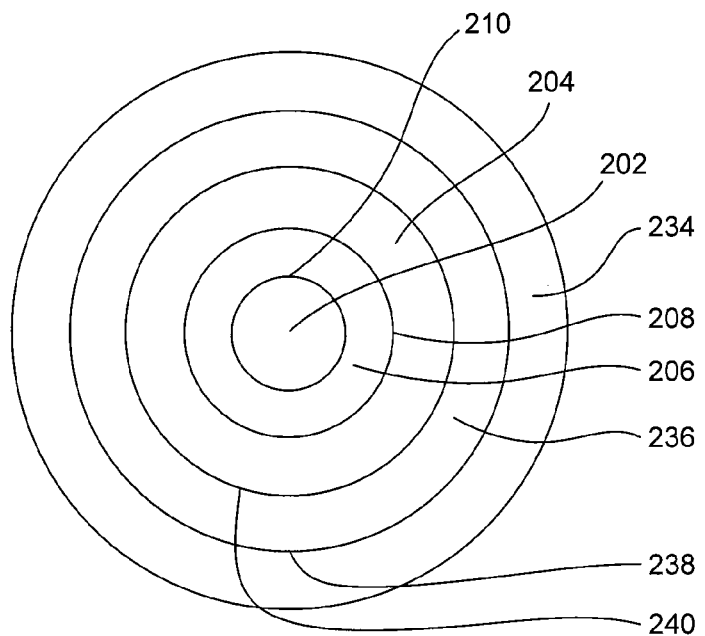
FIG. 6 is a cross-sectional view of one set of coaxial terminal lead and terminal tubes of the terminal assembly of FIG. 5.

As illustrated by FIG. 6, each of the terminal leads 202 and first terminal tubes 204 are electrically insulated from one another by an insulator 206 which is fixed to the inner surface 208 of the first terminal tubes 204 and the outer surface 210 of the terminal leads 202. The first terminal tubes 204 and the second terminal tubes 234 are electrically insulated from one another by an insulator 236 which is fixed to the inner surface 238 of the second terminal tube 234 and the outer surface 240 of the first terminal tube 204.

Referring back to FIG. 5, the terminal leads 202 and the first and second sets of terminal tubes 204 and 234 pass through a conductive substrate or ferrule 212 containing two passageways (as illustrated in FIG. 1) through which two insulators 214 extend. The insulators 214 each contain two passageways (as illustrated in FIG. 1) through which the terminal leads 202 and the first and second sets of terminal tubes 204 and 234 extend. The ferrule 212 also contains an aperture (as illustrated in FIG. 1) in a center portion in which a ground lead 216 is affixed.

As illustrated in FIG. 5, a first filter capacitor 218 is coupled at one end 220 to a surface of the ferrule 212 and the insulators 214 (not shown), and has four passageways through which each of the second set of terminal tubes 234 are affixed and electrically coupled to and extend through and a center passageway through which the ground lead 216 is affixed and electrically coupled to and extends through. A second filter capacitor 222 has four passageways through which each of the first set of terminal tubes 204 are affixed and electrically coupled to and extend through and a center passageway through which the ground lead 216 is affixed and electrically coupled to and extends through. A third filter capacitor 242 has four passageways through which each of the four terminal leads 202 are affixed and electrically coupled to and extend through and a passageway through which the ground lead 216 is affixed and electrically coupled to and extends through. Thus, a filter capacitor is provided for each of the set of terminal leads 202, the first set of terminal tubes 204, and the second set of terminal tubes 234.

As also illustrated in FIG. 5, the terminal leads 202 and the first and second sets of terminal tubes 204 and 234 are adapted to be electrically coupled to internal circuitry disposed within an implantable medical device through coupling with a substrate 228. The applicable materials and methods of attachment of the components illustrated for the embodiments of FIGS. 1-4 are incorporated herein.

In FIG. 5, substrate 228 contains conductive paths in its interior (not shown) to electrically couple the terminal leads 202, first set of terminal tubes 204, second set of terminal tubes 234, and ground lead 216 to internal circuitry of an implantable medical device.

A first set of four conductive holders 224, a second set of five conductive holders 226, and a third set of conductive holders 244 are disposed on the substrate 228. The first set of conductive holders 224 are of a suitable shape and size to receive the second set of terminal tubes 234. The outer four of the second set of conductive holders 226 are of a suitable shape and size to receive the first set of terminal tubes 204. The center conductive holder 232 of the second set of conductive holders is of a suitable shape and size to receive the ground lead 216. The third set of conductive holders 244 are of a suitable shape and size to receive the terminal leads 202.

Also as shown in FIG. 5, substrate 228 has a plurality of wire bonding pads 230 disposed thereon. The wire bonding pads are adapted to be conductively coupled to the first, second, or third set of conductive holders 224, 226, 244 by conductive paths in the inside of the substrate (not shown). For example, each of the four of the first set of conductive holders 224, each of the five of the second set of conductive holders 226, and each of the four of the third set of conductive holders 244 is conductively coupled to an individual wire bonding pad 230.

The wire bonding pads 230 are adapted to be electrically coupled to internal circuitry disposed within an implantable medical device by, for example wires attached to the wire bonding pads and to the internal circuitry of the implantable medical device.

Example embodiments of the methods and components of the present invention have been described herein. As noted elsewhere, these example embodiments have been described for illustrative purposes only, and are not limiting. Other embodiments are possible within the scope of the invention. Such embodiments will be apparent to persons skilled in the relevant art(s) based on the teachings contained herein.

For example, the number of poles for which a coaxial lead/tube feedthrough terminal assembly can be made is not limited, and beyond the eight and twelve pole configurations illustrated can include bipolar (two), tripolar (three), quadripolar (four), pentapolar (five), hexapolar (six), and higher number of poles, depending upon the number of leads and sets of coaxial tubes, including multiple coaxial tubes (e.g., one, two, three, or more sets of coaxial tubes). It should also be understood that a feedthrough terminal assembly having an odd number of poles (e.g. three of five poles) can be made from having one or more leads without a corresponding coaxial tube.

Thus, the breadth and scope of the present invention should not be limited by any of the above-described exemplary embodiments, but should be defined only in accordance with the following claims and their equivalents.

What is claimed is:

1. A feedthrough filter capacitor assembly for an implantable medical device comprising:
    a conductive lead;
    a conductive tube coaxial with and insulated from at least a portion of the lead;
    a conductive substrate through which the lead and tube pass in non-conductive relation therewith;
    a first filter capacitor having a passageway through which the tube extends, the tube being electrically coupled to the first filter capacitor; and
    a second filter capacitor having a passageway through which the lead extends, the lead being electrically coupled to the second filter capacitor.

2. The feedthrough assembly of claim 1, further comprising an insulator fixed to the lead and to the tube to provide electrical insulation between the lead and the tube.

3. The feedthrough assembly of claim 2, further comprising an insulator fixed to the tube and to the conductive substrate to provide electrical insulation between the tube and the conductive substrate.

4. The feedthrough assembly of claim 3, wherein the lead, tube, conductive substrate, and insulators comprise a prefabricated terminal subassembly.

5. The feedthrough assembly of claim 1, wherein the lead and the tube are adapted to be electrically coupled to internal circuitry disposed within an implantable medical device.

6. The feedthrough assembly of claim 1, wherein the tube is coupled to a first conductive holder, the lead is coupled to a second conductive holder, and the first and second holders are adapted to be electrically coupled to internal circuitry disposed within an implantable medical device.

7. The feedthrough assembly of claim 6, wherein the first and second holders comprise a gold-plated iron-nickel-cobalt alloy material.

8. The feedthrough assembly of claim 6, wherein the first and second holders are coupled to a nonconductive substrate.

9. The feedthrough assembly of claim 8, wherein the nonconductive substrate comprises first and second wire bonding pads disposed thereon, wherein the first wire bonding pad is conductively coupled to the first holder and the second wire bonding pad is conductively coupled to the second holder, and wherein the first and second wire bonding pads are adapted to be electrically coupled to internal circuitry disposed within an implantable medical device.

10. The feedthrough assembly of claim 1, wherein the conductive substrate is adapted to be mounted onto a housing of an implantable medical device in a position extending through an opening of the housing.

11. The feedthrough assembly of claim 10, wherein the conductive substrate is a ferrule.

12. The feedthrough assembly of claim 1, wherein the first and second filter capacitors comprise discoidal filter capacitors.

13. The feedthrough assembly of claim 1, further comprising: a ground lead coupled to the conductive substrate and extending into a second passageway of the first filter capacitor in conductive relation therewith and extending into a second passageway of the second filter capacitor in conductive relation therewith.

14. The feedthrough assembly of claim 13, further comprising an insulator fixed to the conductive lead and to the tube to provide electrical insulation between the conductive lead and the tube and an insulator fixed to the tube and to the conductive substrate to provide electrical insulation between the tube and the conductive substrate;
wherein the conductive substrate is a ferrule adapted to be mounted onto a housing of an implantable medical device in a position extending through an opening of the housing;
wherein the first and second filter capacitors comprise discoidal filter capacitors; and
wherein the conductive lead and the tube are adapted to be electrically coupled to internal circuitry disposed within an implantable medical device.

15. The feedthrough assembly of claim 14, wherein the tube is coupled to a first conductive holder and the conductive lead is coupled to a second conductive holder, the first and second holders coupled to a nonconductive substrate comprising first and second wire bonding pads disposed thereon;
wherein the first wire bonding pad is conductively coupled to the first holder and the second wire bonding pad is conductively coupled to the second holder; and
wherein the first and second wire bonding pads are adapted to be electrically coupled to internal circuitry disposed within an implantable medical device.

16. The feedthrough assembly of claim 1, further comprising a second conductive tube coaxial with and insulated from the first tube, and a third filter capacitor having a passageway through which the second tube extends, the second conductive tube being electrically coupled to the third filter capacitor.

17. The feedthrough assembly of claim 16, further comprising: a ground lead coupled to the conductive substrate and extending into a second passageway of the first filter capacitor in conductive relation with the first filter capacitor and extending into a second passageway of the second filter capacitor in conductive relation with the second filter capacitor and extending into a second passageway of the third filter capacitor in conductive relation with the third filter capacitor.

18. The feedthrough assembly of claim 1 comprising four conductive leads, each of the leads having a respective conductive tube coaxial with and insulated from at least a portion of the respective lead;
wherein each of the tubes extend through a passageway of the first filter capacitor in conductive relation therewith and
wherein each of the leads extend through a passageway of the second filter capacitor in conductive relation therewith.

19. The feedthrough assembly of claim 18, further comprising a ground lead coupled to the conductive substrate and extending into a second passageway of the first filter capacitor in conductive relation therewith and extending into a second passageway of the second filter capacitor in conductive relation therewith.

20. The feedthrough assembly of claim 19, further comprising an insulator fixed to each conductive lead and to each respective tube to provide electrical insulation between each conductive lead and each respective tube and an insulator fixed to each tube and to the conductive substrate to provide electrical insulation between each tube and the conductive substrate;
wherein the conductive substrate is a ferrule adapted to be mounted onto a housing of an implantable medical device in a position extending through an opening of the housing;
wherein the first and second filter capacitors comprise discoidal filter capacitors; and
wherein the leads and the tubes are adapted to be electrically coupled to internal circuitry disposed within an implantable medical device.

* * * * *